(12) United States Patent
Kaufmann et al.

(10) Patent No.: US 8,762,422 B2
(45) Date of Patent: Jun. 24, 2014

(54) OPTIMIZATION OF MEMORY BY TAILORED GENERATION OF RUNTIME STRUCTURES

(75) Inventors: Artur Kaufmann, Landau (DE); Georg Lang, Ludwigshafen am Rhein (DE)

(73) Assignee: SAP AG, Walldorf (DE)

( * ) Notice: Subject to any disclaimer, the term of this patent is extended or adjusted under 35 U.S.C. 154(b) by 32 days.

(21) Appl. No.: 13/212,542

(22) Filed: Aug. 18, 2011

(65) Prior Publication Data

US 2013/0046940 A1  Feb. 21, 2013

(51) Int. Cl.
*G06F 17/30* (2006.01)
(52) U.S. Cl.
USPC .......................................... 707/803; 707/809
(58) Field of Classification Search
USPC .................................................. 707/803, 809
See application file for complete search history.

(56) References Cited

U.S. PATENT DOCUMENTS

| | | | | |
|---|---|---|---|---|
| 7,720,804 B2* | 5/2010 | Fazal et al. | ..................... | 707/601 |
| 2002/0178188 A1* | 11/2002 | Irizarry | ........................ | 707/517 |
| 2003/0083962 A1* | 5/2003 | Araki et al. | ..................... | 705/27 |
| 2003/0093337 A1* | 5/2003 | Song et al. | ....................... | 705/27 |
| 2007/0250769 A1* | 10/2007 | Bass et al. | ..................... | 715/523 |
| 2010/0107056 A1* | 4/2010 | Underhill et al. | .............. | 715/235 |
| 2010/0205551 A1* | 8/2010 | Underwood et al. | ......... | 715/760 |
| 2011/0029577 A1* | 2/2011 | Notani et al. | ................. | 707/804 |
| 2011/0119689 A1* | 5/2011 | McCrae et al. | ............... | 719/328 |
| 2011/0202442 A1* | 8/2011 | Rabstejnek | ..................... | 705/34 |

OTHER PUBLICATIONS

McIntosh, Nathaniel, et al., "Whole-Program Optimization of Global Variable Layout", Java, Compilers, and Tools Laboratory, Hewlett-Packard Co., 2006, pp. 164-172.
Nakar, Doron, et al., "Selective Main Memory Compression by Identifying Program Phase Changes", Tel Aviv University, 2004, pp. 96-101.

* cited by examiner

*Primary Examiner* — Cam Truong
(74) *Attorney, Agent, or Firm* — Kenyon & Kenyon LLP

(57) ABSTRACT

Data structures used to store data in an enterprise resource planning (ERP) system may be configured and custom-generated in a configuration mode of the ERP system where a subset of selectable data fields may be selected to avoid allocating space and resources to unused data fields. The data structures may then be generated in the configuration mode to eliminate the unused data fields at runtime. This in turn saves space and resources that would otherwise be allocated but not used. In ERP systems substantial space and computing resources may be saved by only allocating space and resources to only those resources that a specific customer intends to use.

19 Claims, 5 Drawing Sheets

OPTIMIZATION OF MEMORY BY TAILORED GENERATION OF RUNTIME STRUCTURES

BACKGROUND

Many organizations rely on computing systems such as enterprise resource planning (ERP) systems to electronically manage business processes and functions. These ERP systems may contain different modules to perform different tasks, such as invoicing, accounting, inventory control, and so on. These modules may be used by different businesses in different industries—each of these businesses and industries may have unique business processes or procedures. For example, in the telecommunications industry, phone companies may charge customers a flat rate for certain services and a fixed per-use rate for other services. However, in the aviation industry, airlines may routinely modify the fares charged for each flight so that different customers may pay different fares depending on when they booked their flight. Thus, the same invoicing module may be configured differently for different industries, such as the airline industry or the telecommunications industry.

Even with the same industry, different companies may implement different policies and procedures. For example, one company may accept credit cards as a payment option while another may only accept checks.

Since a single ERP system may be used by different companies in different industries, the ERP system may be initially configured to support a wide range of different business practices, policies, and procedures. This initial configuration may include data structures, such as databases and tables, including wide varieties of data fields that may be used by different companies. Given the wide variety of data fields included in ERP system to accommodate different industries and functions, it is likely that at least some of the data fields will not be used by different companies.

These unused fields may be stored in memory leading to an inefficient use of computing resources. While it is possible to manually remove each of the unused fields from the data structures and memory, doing so is impractical and costly. ERP systems may have hundreds of data structures containing hundreds of fields—the personnel requirements alone may be cost prohibitive. Additionally, if a data field in use is improperly edited or removed, unexpected errors may occur at runtime. Diagnosing these errors may also require additional resources and expense that could otherwise be avoided.

In sum, there is a need to eliminate extraneously information from data structures and memory to improve system performance at runtime while minimizing the potential for errors.

DETAILED DESCRIPTION

Figure 1:
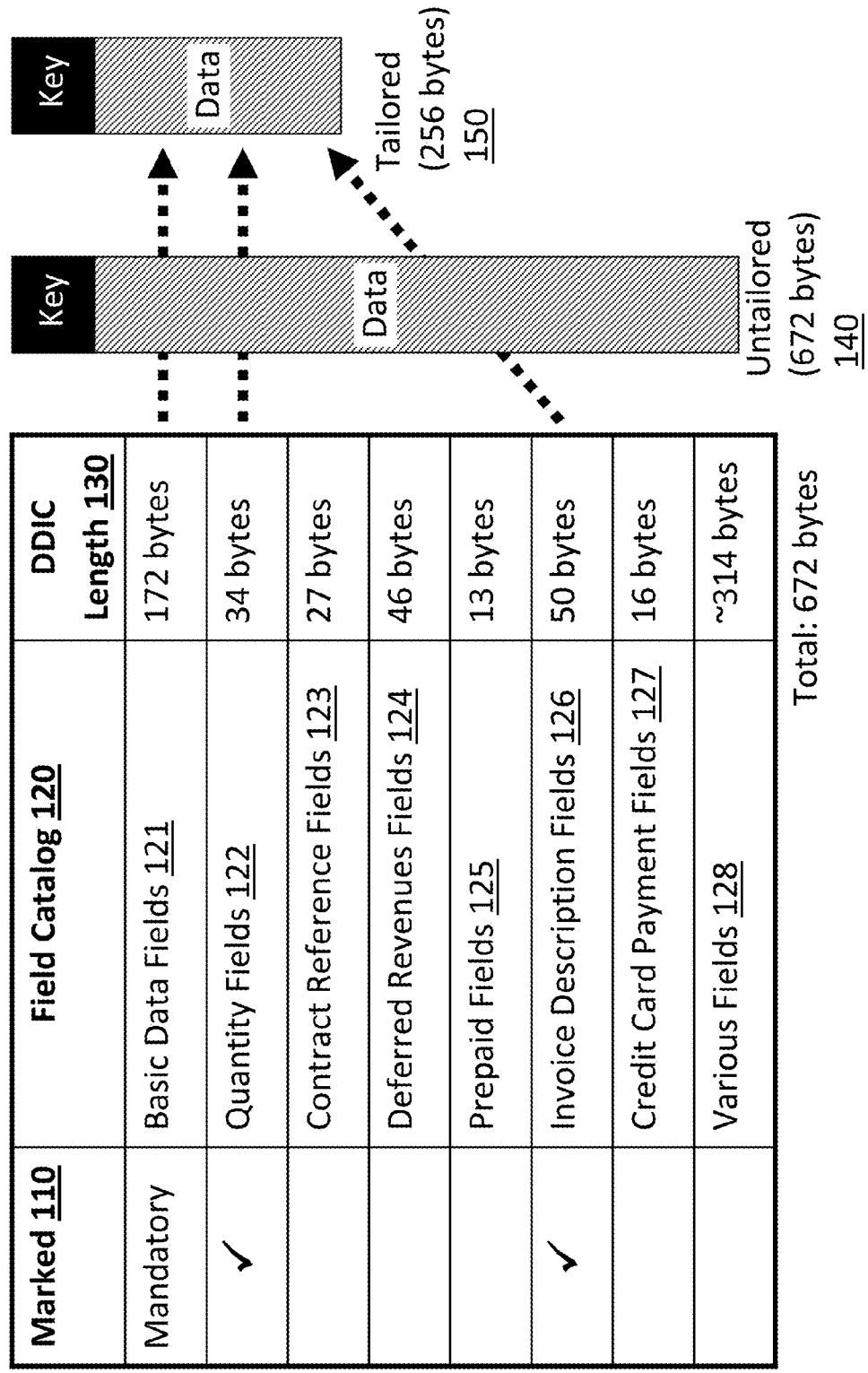
FIG. 1 shows an exemplary catalog of data fields in an embodiment of the invention.

In an embodiment of the invention, data structures, such as databases, tables, and other storage arrangements that store data in an enterprise resource planning (ERP) system may be configured and custom-generated in a configuration mode. In the configuration mode, the organization may select a subset of optional data fields that the organization intends to use during runtime to avoid allocating space and resources to the unused data fields. This selection may be performed by computer configuration experts or other computer users working for the organization who may select these optional data fields from catalogs displayed in a user interface. Some of these exemplary catalogs and user interfaces are described below and shown in the figures.

Data structures may then be created using the selected subset of data fields so that at runtime the generated data structures no longer support the non-selected data fields. This in turn saves space and resources that would otherwise be allocated but not used. In ERP systems which include a wide variety of data fields designed for different processes used by different organizations in different industries with different computing requirements, substantial space and computing resources may be saved by only allocating space and resources to data fields that are actually used.

Once the particular data fields, such as optional fields, that an organization intends to use in the ERP system have been identified in the configuration mode, the data structures may be generated. The data structures may be generated to only include the selected fields the organization intends to use as well as other essential fields necessary for the ERP system to function, such as, for example, any fields designated as mandatory fields. Similar fields that appear in more than one data structure may be automatically linked or otherwise associated to preserve data consistency and continuity between different functions and processes in the ERP system.

Once the data structures have been generated, the data associated with each of the data structures may be inserted, imported, or otherwise entered, accessed, and/or modified in each data structure as determined by the ERP system. At runtime, the data associated with the fields included in the generated data structures may be loaded into memory where the other fields not included in the generated data structures may not be loaded into memory.

If a data structure is to be changed in the future, such as if the organization decides to keep track of an additional parameter or provide an additional service necessitating the need to store an additional field, the configuration mode may be re-entered. The data fields that are to be added may be selected and thereafter, a new data structure may be generated or the existing data structure may be modified. If an additional data field is added to an existing data structure, then the data structure may be expanded to accommodate the additional data. Alternatively, if a new data structure is created, the new data structure may be used in conjunction with the old structure.

FIG. 1 shows an exemplary catalog of data fields in an embodiment. The field catalog 120 may list each of the data fields or data field categories used in the ERP system. The data field categories may also be known as Interface Components, which is a term that may be used by some entities, including SAP. In this example, the categories include basic data 121, quantity fields 122, contract reference fields 123, deferred revenue fields 124, prepaid fields 125, invoice description fields 126, credit card payment fields 127 and various other fields 128. Other than the basic data fields 121, which are shown as mandatory, each of the other field categories may be selected or unselected through the marked boxes 110. In this example, the quantity fields 122 and invoice description fields 126 are selected.

In some instances the field catalog may list individual data fields, such as customer first name field and customer last name field. The field catalog may also list broader categories representing a compilation of data fields. For example, the credit card payments fields 127 may including those data fields relating to credit card payments, such as credit card number field, expiration date field, credit card name field, authorized code field, charged amount field, and so on. In some instances, the field catalog may have a hierarchical tree structure with broader categories of fields that may be selected, and/or individual fields within a category that may be selected. Thus, in the credit card example, fields such as the credit card number field, expiration date field, credit card name field, authorized code field, charged amount field, and so on may be selectable nodes that appear when the credit card payment field 127 is expanded. Each field catalog, its descendents, and/or its ancestors may be individually selected or deselected. In some instances, selecting or deselecting a parent node may automatically select or deselect its children and/or other descendants.

The amount of space (in bytes) allocated to each data field in field catalog 120 database is shown in the data dicitonary (DDIC) length column 130. In this example, if space was allocated for each of the possible data fields listed in the field catalog 120, each data record would have an untailored length of 672 bytes as shown in untailored length 140. However, by generating a data structure that only supports the selected quantity fields 122 and invoice description fields 126, in addition to the mandatory basic data fields 121, the space allocated for each data record in the structure may be reduced to 256 bytes as shown in tailored length 150, resulting in an estimated space savings of over 60% in a hypothetical computing environment.

Figure 2:
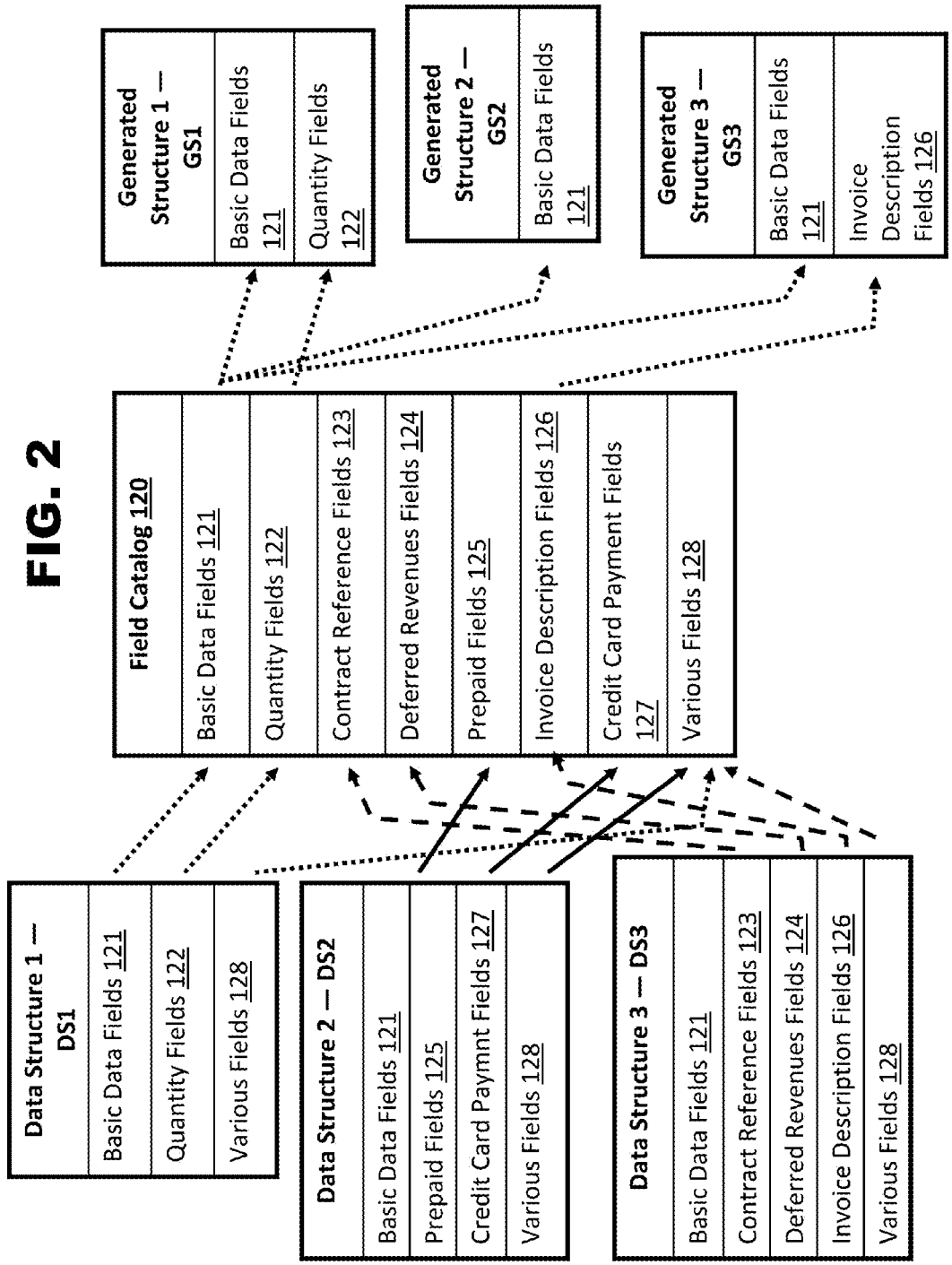
FIG. 2 shows an example of how the field catalog may be generated in an embodiment.

FIG. 2 shows an example of how the field catalog may be generated in an embodiment. In this example, the ERP system may be configured to support three data structures, DS1 to DS3. Each of the data structures may include fields designated as mandatory fields, such as the basic data fields 121. The first data structure DS1 may also support the quantity fields 122 and the various fields 128. The second data structure DS2 may support the prepaid fields 125, credit card payment fields 127, and various fields 128. The third data structure DS3 may support the contract reference fields 123, deferred revenue fields 124, invoice description fields 126, and various fields 128. To assemble the field catalog 120, each of the unique support fields in each of different data structures may be extracted and listed in the field catalog 120. Since the basic data fields 121 are mandatory, the basic data fields 121 may be included in each generated data structure, such as GS1 and GS3. The generated data structures may include or also be known as a Class of Billable Items, which is a term that may be used by some entities, including SAP. Additionally, those data structures having selected fields 110 in FIG. 1 may also be generated. In the example shown in FIG. 2, this would be the quantity fields 122 and invoice description fields 126, which are included in DS1 and DS3 respectively. Thus, the generated data structures would include Generated Structure GS1 supporting the basis data fields 121 and quantity fields 122, Generated Structure GS2 supporting the basic data fields 122, and Generated Structure GS3 supporting the basic data fields 121 and invoice description fields 126.

Figure 3:
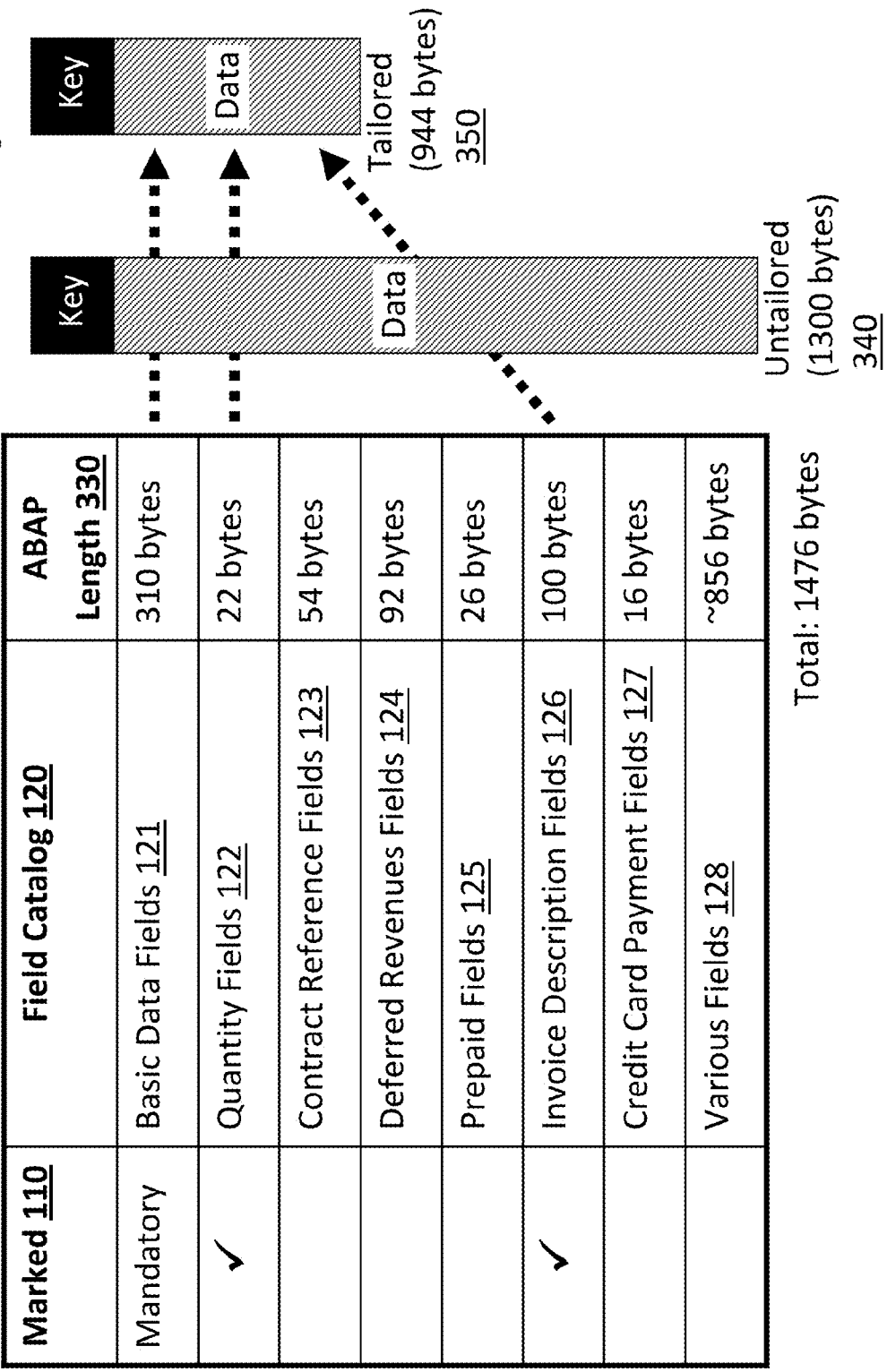
FIG. 3 shows how memory may be optimized in an embodiment having the same catalog of data fields as in FIG. 1.

FIG. 3 shows how memory may be optimized in an embodiment having the same catalog of fields as in FIG. 1. In this embodiment, a data structure may be generated from an exemplary catalog of data fields 120 in an embodiment and populated with data. The data may then be loaded into memory. The ABAP length column 330 shows the estimated allocated amount of bytes of data that may be saved during runtime in a hypothetical computing environment for each of the fields in the field catalog 120. The field catalog 120 may list each of the data fields or data field categories used in the ERP system. In this example, the categories are the same as shown in FIG. 1, and include basic data fields 121, quantity fields 122, contract reference fields 123, deferred revenue fields 124, prepaid fields 125, invoice description fields 126, credit card payment fields 127 and various other fields 128. Other than the basic data fields 121, which are shown as mandatory, each of the other field categories may be selected or unselected through the marked boxes 110. In this example, the quantity fields 122 and invoice description fields 126 are selected.

If a data structure including each of the fields listed in the field catalog 120 is generated, populated with data, and loaded into memory, each data record may be estimated to be allocated about 1,300 bytes of memory in a hypothetical computing environment, representing the sum of length of data in the mandatory basic data fields 321 (310 bytes), the selected quantity fields 322 (22 bytes), the selected invoice description fields 326 (100 bytes), the null values in the remaining fields and the other fields, such as any mandatory standard fields (868 bytes).

When selecting the fields to be included in generated data structures in a tailored 350 embodiment, the data structure including only the actually selected and used data fields may be generated, populated with data, and loaded into memory. In this case, the generated data structure may only include the mandatory basic data fields 321, and the selected 310 quantity fields 322 and invoice description fields 326. Thus, when these data records are loaded into memory, each data record may be expected to occupy only 944 bytes of memory, representing the sum of the allocated length of data 330 in the mandatory basic data fields 321 (310 bytes), the selected quantity fields 322 (22 bytes), the selected invoice description fields 326 (100 bytes), and the other fields, such as any mandatory standard fields (512 bytes). This may result in an expected memory savings of more than 25% over the untailored scenario 340.

Figure 4:
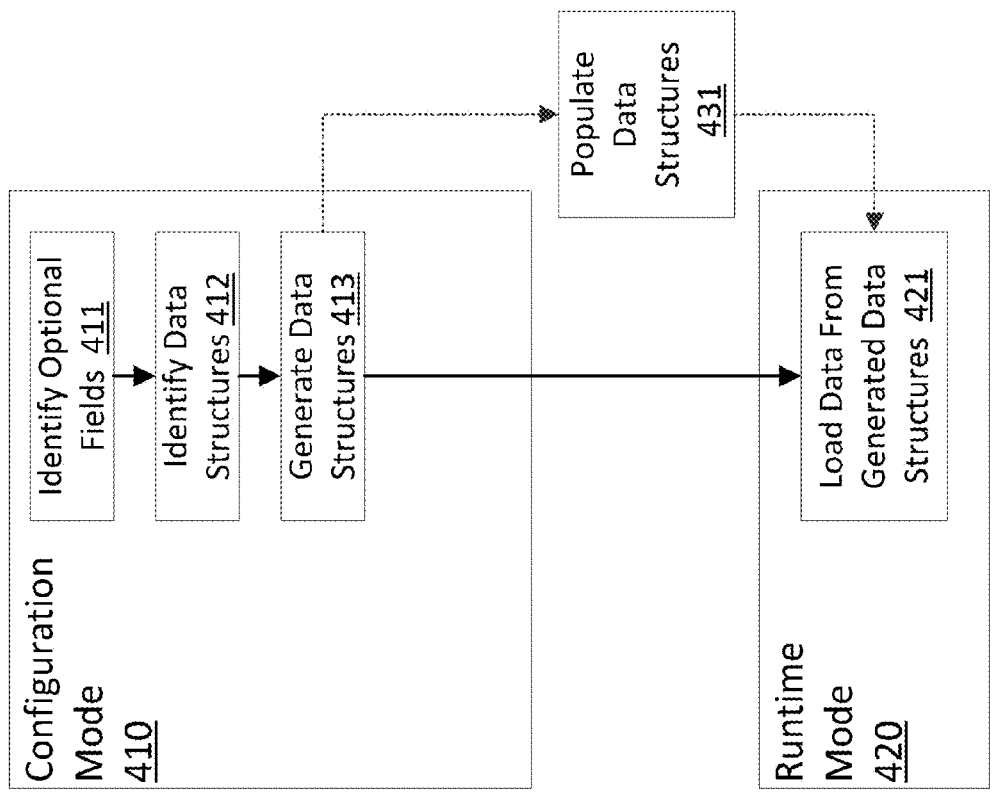
FIG. 4 shows an exemplary process in an embodiment of the invention.

FIG. 4 shows an exemplary process in an embodiment of the invention. The process may vary depending on which mode the ERP system is in. A configuration mode 410 may be used to set up, install, or configure various settings of the ERP system. Different customizations, features, and modules of the ERP system may be selected and implemented in the configuration mode. Once the selections have been made, the selections may be implemented and the ERP system may then be used in the runtime mode with the implemented selections.

While in the configuration mode 410, optional fields that may be included in at least one data structure supported or used by the ERP to store, manage, or organize data may be identified. The data structure provides an organized arrangement for large quantities of data that may be stored, accessed, changed, or otherwise managed by the ERP system. In some embodiments the optional fields may be identified by extracting a list of fields that may be included in each data structure used by the ERP system, identifying the unique, non-duplicated fields, and then presenting a consolidated list of the optional fields to another program or procedure for selection. A field catalog may be created from the list of fields. The field catalog may, in some instances, group together related fields into broader field categories. These groupings may include tree structures with the broader categories representing parent nodes and the narrower categories and individual fields representing child nodes.

In some instances, the broader field categories included in the field catalog may represent particular modules or functionality offered by the ERP system. For example, both an invoicing function and an accounting function may, if the organization accepts credit cards, read and process stored credit card data through a credit card module. Thus, if an organization intends to process credit card payments, the credit card payment field category may be selected, which may include a credit card type field, credit card number field, credit card name field, credit card expiration date field, and so on. The category name, in this case credit card payment category, and the data fields included with the category may be determined by the structure of the fields in the ERP system. For example, in some embodiments, each of the aforementioned credit card fields may be included in a same credit card processing module. Thus, the extraction process may, in some instances, identify broader field categories and the specific data fields included in the categories from various modules included in the ERP system.

Once the data fields or field categories have been identified, a selection may be made of those fields or field categories that the organization actually intends to use. In box 412, each of the data structures in the ERP system in which the selected fields or field categories appear may be identified.

In box 413, each of the identified data structures may be generated to include support for any mandatory fields and data as well as the additional selected fields and/or field categories. Those non-mandatory fields and/or field categories that were not selected for inclusion in the data structure need not be included in the data structure and need not be supported by the data structure. The data structure may be generated as an Advanced Business Application Programming (ABAP) Data Dictionary (DDIC) structure or, in some other embodiments, that may be an equivalent array or map structure in Java.

The runtime mode 420 may be used during runtime, when the ERP system is used to facilitate business operations and processes. For example, in an invoicing system, the invoices may actually be generated in the runtime mode using customer data and product/usage data stored in the generated data structures.

In box 431, the generated data structures may be populated with data associated with each of the fields in the data structures. In some instances the data may be imported from or obtained from other external computing systems or data storage systems. In other instances the data may originate from another source, such as through a form containing customer supplied information. The data may be then be stored in the data structure itself for use by the ERP system. The data structures may be initially populated with data in the runtime mode 420. Changes to data in the data structure that occur during business operations may occur in the runtime mode 420.

In box 421, data associated with the data fields and/or field categories of the generated data structures may be loaded into memory to facilitate quicker access to the data. The loading of this data into memory may occur in the runtime mode 420. To minimize memory use, only data associated with those fields and field categories included in the generated data structure may be loaded into memory. Any other non-mandatory data fields or field categories need not be loaded into memory.

Figure 5:
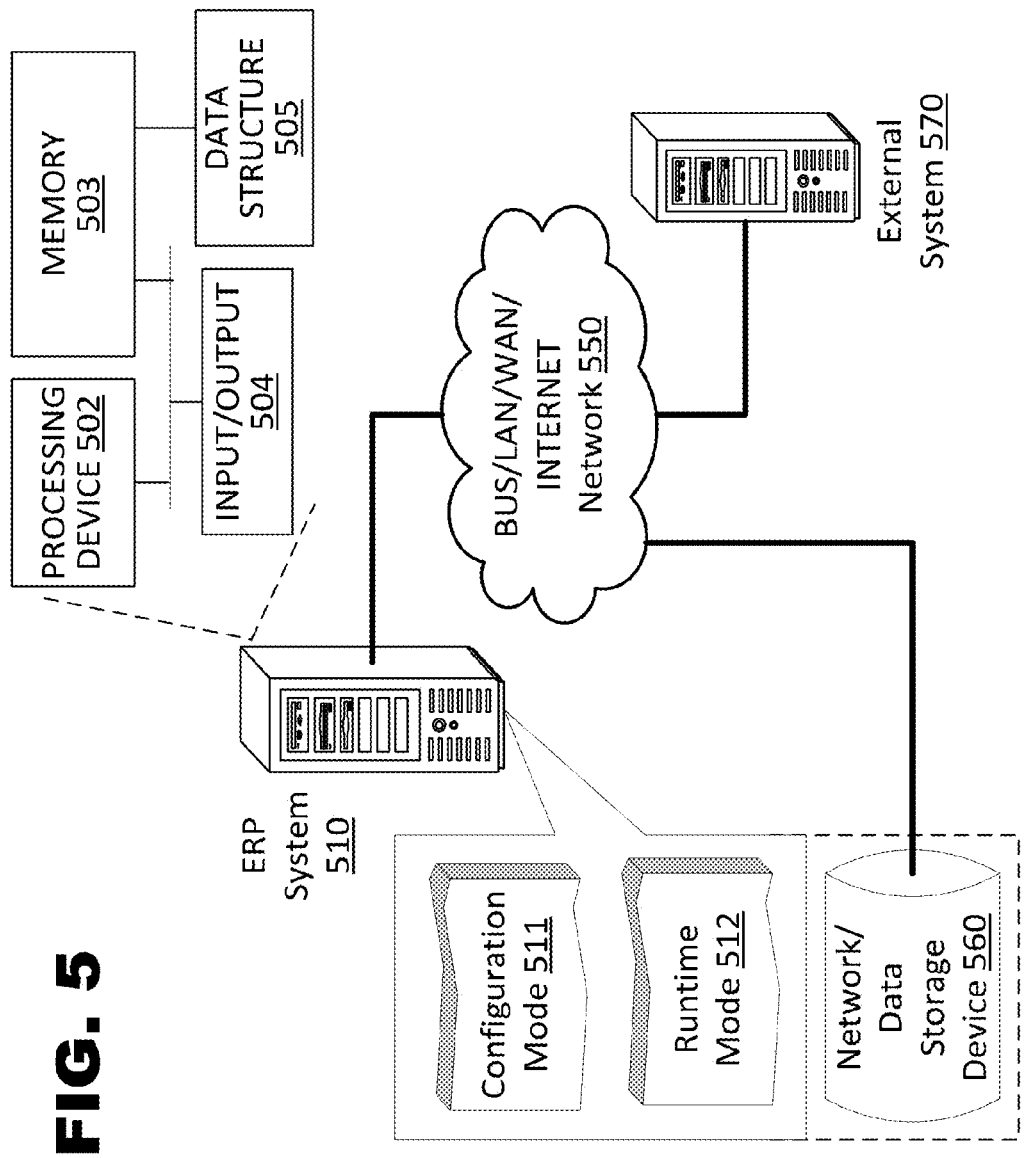
FIG. 5 shows an exemplary architecture in an embodiment of the invention.

FIG. 5 shows an exemplary architecture in an embodiment of the invention. ERP system 510 may include a configuration mode 511 and a runtime mode 512. ERP system 510 may be connected to a network 550. Network 550 may include a LAN, WAN, bus, or the Internet. ERP system 510 may interface with other systems and component depending on the application. For example, a network/data storage device 560 may be used to store the generated data structures. The storage device 560 may be a part of the ERP system 510. In some embodiments the network storage device 560 may also be separate from the ERP system 510 but connected to it through network 550. The storage device 560 may contain a hard disk drive, flash memory, or other computer readable media capable of storing data. Other external systems and data sources 570 may also be connected to network 550. These other systems 570 may be used to supply additional data or information used by the ERP system 510, such as, for example, the initial data used to populate the generated data structures.

Each of the systems, clients, and devices in FIG. 5 may contain a processing device 502, memory 503 storing loaded data or a loaded data structure 505, and an communications device 504, all of which may be interconnected via a system bus. In various embodiments, each of the systems 510, 560, and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone.

We claim:

1. A computer implemented method comprising:
   in a configuration mode during an installation of an enterprise resource planning (ERP) system:

extracting optional data fields included in each of a plurality of data table structures used by various modules of the ERP system at runtime to access enterprise data;

presenting a user with a consolidated list of non-duplicate extracted optional data fields;

responsive to a selection of at least one of the optional fields from the consolidated list, identifying from those data structures scheduled for creation during the installation of the ERP system, a subset of the data structures containing either a mandatory data field or at least one of the selected optional fields;

generating, using a processing device during the installation, only the identified subset of data structures for use at runtime, each generated data structure including only any mandatory data fields and any selected optional fields specified by the ERP system as associated with the generated data structure and excluding other fields specified by the ERP system as associated with the generated data structure;

linking similar fields appearing in more than one generated data structure; and in a runtime mode of the ERP system after completing the installation, loading data associated with the data fields included in each generated data structure into a memory as determined by the ERP system, wherein data associated with data structures other than the identified subset of data structures and the excluded other fields are not loaded into the memory in the runtime mode, wherein non-selected optional fields are not supported by the ERP system in the runtime mode, wherein an initial populating of the generated data structures occurs in the configuration mode and any subsequent modification of data in the generated data structure occurs in the runtime mode.

2. The method of claim 1, wherein the identified optional fields are grouped into catalogs made up of individual fields, the selection involves selecting at least one of the catalogs, which in turn causes each of the individual fields in the selected catalog(s) to be automatically selected.

3. The method of claim 2, further comprising extracting a list of catalogs associated with each data structure from the ERP system to identify the optional fields included in each data structure of the ERP system.

4. The method of claim 1, wherein at least one of the data structures includes a mandatory field that is automatically included in the generated data structure irrespective of the selection.

5. The method of claim 1, further comprising comparing the selection of at least one of the optional fields to a list of fields associated with each data structure to identify each of the data structures in the enterprise resource planning system in which the selected field(s) appears.

6. The method of claim 1, further comprising reentering the configuration mode to add or remove a field included in a data structure.

7. The method of claim 6, further comprising modifying an existing data structure for use in the runtime mode after adding or removing the field in the configuration mode.

8. The method of claim 7, wherein removing the field in the configuration mode causes data associated with the removed field to be deleted from the existing data structure.

9. The method of claim 7, wherein adding the field in the configuration mode enables data associated with the added field to be stored in the existing data structure.

10. The method of claim 1, further comprising populating the generated data structures with enterprise data obtained from an external data source.

11. The method of claim 10, wherein the populating of the generated data structures occurs in the runtime mode.

12. A memory comprising a data storage device having a non-transitory computer readable media storing instructions that, when executed by a processing device, causing the processing device to:

in a configuration mode during an installation of an enterprise resource planning (ERP) system:

extract optional data fields included in each of a plurality of data table structures used by various modules of the ERP system at runtime to access enterprise data;

present a user with a consolidated list of non-duplicate extracted optional data fields;

responsive to a selection of at least one of the optional fields from the consolidated list, identify from those data structures scheduled for creation during the installation of the ERP system, a subset of the data structures containing either a mandatory data field or at least one of the selected optional fields;

generate during the installation only the identified subset of data structures for use at runtime, each generated data structure including only any mandatory data fields and any selected optional fields specified by the ERP system as associated with the generated data structure and excluding other fields specified by the ERP system as associated with the generated data structure;

link similar fields appearing in more than one generated data structure; and in a runtime mode of the ERP system after completing the installation, load data associated with the data fields included in each generated data structure into a memory as determined by the ERP system, wherein data associated with data structures other than the identified subset of data structures and the excluded other fields are not loaded into the memory in the runtime mode, wherein non-selected optional fields are not supported by the ERP system in the runtime mode, wherein an initial populating of the generated data structures occurs in the configuration mode and any subsequent modification of data in the generated data structure occurs in the runtime mode.

13. The memory of claim 12, wherein the identified optional fields are grouped into catalogs made up of individual fields, the selection involves selecting at least one of the catalogs, which in turn causes each of the individual fields in the selected catalog(s) to be automatically selected.

14. The memory of claim 13, further comprising extracting a list of catalogs associated with each data structure from the ERP system to identify the optional fields included in each data structure of the ERP system.

15. The memory of claim 12, wherein non-selected optional fields are not supported by the ERP system in the runtime mode.

16. An enterprise resource planning (ERP) system comprising:

a processing device;

a memory; and a data storage device; wherein the processing device is configured to:

in a configuration mode during an installation of the ERP system:

extract optional data fields included in each of a plurality of data table structures used by various modules of the ERP system at runtime to access enterprise data;

present a user with a consolidated list of non-duplicate extracted optional data fields;

responsive to a selection of at least one of the optional fields from the consolidated list, identify from those data structures scheduled for creation during the installation of the ERP system, a subset of the data structures containing either a mandatory data field or at least one of the selected optional fields;

generate during the installation only the identified subset of data structures for use at runtime, each generated data structure including only any mandatory data fields and any selected optional fields specified by the ERP system as associated with the generated data structure and excluding other fields specified by the ERP system as associated with the generated data structure;

link similar fields appearing in more than one generated data structure; and in a runtime mode of the ERP system after completing the installation, load data associated with the data fields included in each generated data structure into a memory as determined by the ERP system, wherein data associated with data structures other than the identified subset of data structures and the excluded other fields are not loaded into the memory in the runtime mode, wherein non-selected optional fields are not supported by the ERP system in the runtime mode, wherein an initial populating of the generated data structures occurs in the configuration mode and any subsequent modification of data in the generated data structure occurs in the runtime mode.

17. The ERP system of claim 16, wherein the identified optional fields are grouped into catalogs made up of individual fields, the selection involves selecting at least one of the catalogs, which in turn causes each of the individual fields in the selected catalog(s) to be automatically selected.

18. The ERP system of claim 17, further comprising extracting a list of catalogs associated with each data structure from the ERP system to identify the optional fields included in each data structure of the ERP system.

19. The ERP system of claim 16, wherein non-selected optional fields are not supported by the ERP system in the runtime mode.

* * * * *